United States Patent [19]
Sato

[11] Patent Number: 5,889,635
[45] Date of Patent: Mar. 30, 1999

[54] MAGNETIC HEAD SLIDER AND MAGNETIC DISK APPARATUS FOR REDISTRIBUTING A LUBRICANT

[75] Inventor: Akinobu Sato, Tokyo, Japan

[73] Assignee: NEC Corporation, Tokyo, Japan

[21] Appl. No.: 929,096

[22] Filed: Sep. 15, 1997

[30]       Foreign Application Priority Data

Sep. 13, 1996   [JP]   Japan ................................ 8-243256

[51] Int. Cl.⁶ ...................................................... G11B 5/60
[52] U.S. Cl. ............................................................ 360/103
[58] Field of Search ............................................ 360/103

[56]                  References Cited

U.S. PATENT DOCUMENTS

| 5,285,337 | 2/1994 | Best ........................................ 360/103 |
| 5,801,903 | 9/1998 | Meyer .................................... 360/103 |

FOREIGN PATENT DOCUMENTS

| 612808 | 11/1993 | Japan . |
| 644718 | 2/1994 | Japan . |
| 6223533 | 8/1994 | Japan . |
| 6333231 | 12/1994 | Japan . |
| 7147070 | 6/1995 | Japan . |
| WO9314495 | 7/1993 | WIPO . |

OTHER PUBLICATIONS

Harold Hamilton, "Contact Recording on Perpendicular Rigid Media", Journal of the Magnetics Society of Japan, vol. 15 Supplement, No. S2 (1991), pp. 483–490.

*Primary Examiner*—A. J. Heinz
*Attorney, Agent, or Firm*—Sughrue, Mion, Zinn, Macpeak & Seas, PLLC

[57]                  ABSTRACT

A magnetic head slider includes a magnetic recording/reproducing element, a contact pad, and a groove. The magnetic recording/reproducing element moves relative to a magnetic disk medium while being in contact with it, thus recording/reproducing information. The contact pad is integrally formed with the magnetic recording/reproducing element and has a slide surface to slide on a surface of the magnetic disk medium. The groove is in the slide surface of the contact pad to move a lubricant applied on the surface of the magnetic disk medium from an outer peripheral portion to an inner peripheral portion of the magnetic disk medium along with a slide operation of the contact pad. A magnetic disk apparatus is also disclosed.

13 Claims, 4 Drawing Sheets

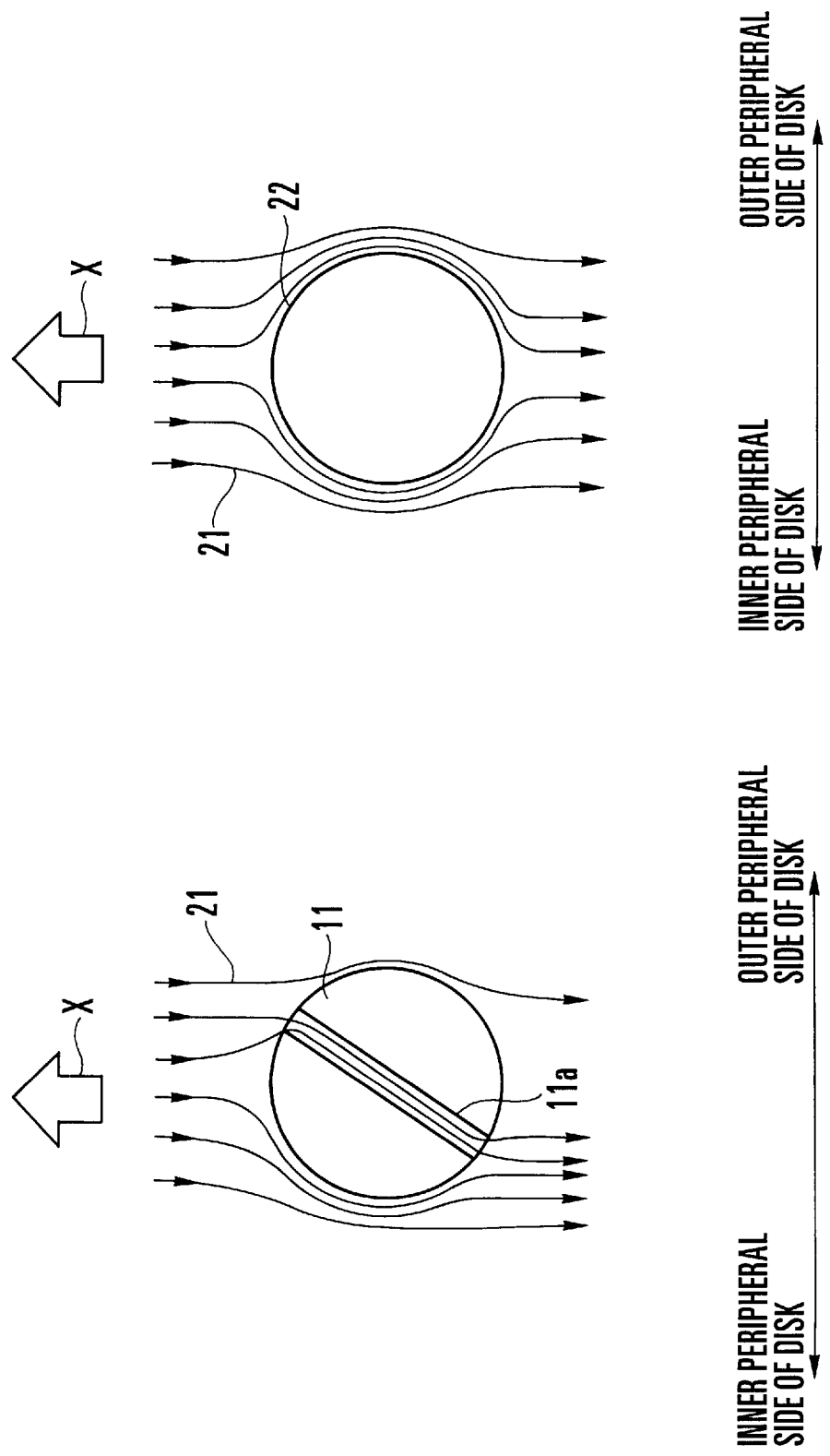

INNER PERIPHERAL SIDE OF DISK  OUTER PERIPHERAL SIDE OF DISK

MAGNETIC HEAD SLIDER AND MAGNETIC DISK APPARATUS FOR REDISTRIBUTING A LUBRICANT

BACKGROUND OF THE INVENTION

The present invention relates to a magnetic head slider and a magnetic disk apparatus and, more particularly, to a contact type magnetic disk apparatus in which the magnetic head slider moves relative to a magnetic disk medium while being in contact with it, thus performing recording/reproduction.

In recent years, the recording density increases steadily in the field of information storage files. In the magnetic disk apparatus, to minimize the gap between the magnetic head that writes/reads information and the magnetic disk medium that holds information is one of the elements that are important in increasing the recording density. A so-called contact type magnetic disk apparatus has been developed in which the magnetic head performs recording/reproduction while in sliding contact with the surface of the magnetic disk medium in order to decrease the gap between the magnetic head and the magnetic disk medium. Examples of such a contact type magnetic disk apparatus are described in H. Hamilton, "CONTACT RECORDING ON PERPENDICULAR RIGID MEDIA", Journal of the Magnetics Society of Japan, Vol. 15 Supplement, No. S2, pp. 483–490, 1991 and in WO 93/14495.

In a contact type magnetic disk apparatus of this type, the magnetic disk medium is coated with a lubricant in order to prevent wear and damage to the magnetic disk medium and magnetic head slider caused by contact between the magnetic disk medium and the contact pads of the magnetic head slider.

In this contact type magnetic disk apparatus, since the lubricant on the magnetic disk medium moves to the outer peripheral portion of the medium due to the centrifugal force generated by high-speed rotation of the magnetic disk medium, the thickness of the lubricant decreases on the inner and intermediate peripheral portions of the magnetic disk medium.

In a floating magnetic disk apparatus, when the CSS (Contact Start Stop) method is employed, the magnetic head slider and the magnetic disk medium slide on each other at the start of operation until the magnetic head slider floats from the magnetic disk medium and at the stop of operation until rotation of the magnetic disk medium stops. In this magnetic disk apparatus, the magnetic disk medium is coated with a lubricant, in the same manner as in the contact type magnetic disk apparatus, and a problem concerning depletion of the lubricant arises in the same manner as in the contact type magnetic disk apparatus.

As "a technique for preventing depletion of the lubricant on the magnetic disk medium" concerning the conventional floating magnetic disk apparatus, the carbon protective film containing hydrogen and nitrogen is formed on the magnetic disk medium, and the lubricant to be applied on the protective film is made to have a polar group, so that coupling between the lubricant and the protective film is strengthened, as shown in Japanese Patent Laid-Open No. 6-333231.

As "a technique for preventing depletion of the lubricant on the magnetic disk medium" concerning the conventional contact type magnetic disk apparatus, an integrated head-suspension-wick system is employed in the head suspension so that the lubricant is supplied to the surface of the magnetic disk medium by the capillary phenomenon, as shown in Japanese Patent Laid-Open No. 6-223533.

As another example of "the technique for preventing depletion of the lubricant on the magnetic disk medium", the width of the front end of the contact pad is made larger than that of the rear end thereof to suppress a decrease in the lubricant on the magnetic disk medium under the contact pad, as shown in Japanese Patent Laid Open Nos. 6-12808 and 6-44718.

Japanese Patent Laid-Open No. 7-147070 discloses a magnetic head slider in which the shape of the contact pad is made appropriately in order to suppress a decrease in the lubricant under the contact pad even if a skew angle is formed upon movement of the magnetic head from the inner periphery to the outer periphery of the magnetic disk medium. In this magnetic head slider, the angle of the side surface of the contact pad is made larger than the maximum absolute value of the skew angle. Hence, when the magnetic head slider moves from the inner peripheral side to the outer peripheral side of the magnetic disk medium, the effect of suppressing a decrease in the lubricant is achieved over the entire angular range of the seek operation of the contact pad.

According to Japanese Patent Laid-Open No. 7-147070, the leading edge portion of the contact pad is not parallel to the trailing edge portion thereof. This makes it possible to cause the skewed leading edge portion to provide an extra air-bearing lift at the inner peripheral side of the disk where the local disk speed is low, and a smaller lift at the outer peripheral side of the disk where the air-bearing effect is large because of the higher local disk speed.

As described above, according to the conventional contact type magnetic disk apparatus, since the lubricant on the magnetic disk medium moves to the outer peripheral portion due to the centrifugal force caused by high-speed rotation of the magnetic disk medium, the thickness of the lubricant decreases on the inner and intermediate peripheral portions of the magnetic disk medium, causing wear and damage to the magnetic disk medium and magnetic head slider (contact pad). This problem hinders realization of a high recording density and high reliability of the contact type magnetic disk apparatus.

In order to avoid this problem, the coupling force between the lubricant on the magnetic disk medium and the protective film is increased in the contact type magnetic disk by "the technique for strengthening coupling between the lubricant and the protective film" employed by the CSS type floating magnetic disk apparatus. Nevertheless, wear and damage to the magnetic disk medium and magnetic head slider cannot be prevented due to the following reason. In the contact type magnetic disk apparatus, since the magnetic slider and the magnetic disk medium are always in contact with each other, the lubricant on the magnetic disk medium tends to move easily, and the effect of increasing the coupling force between the lubricant on the magnetic disk medium and the protective film rarely occurs.

The method of supplying the lubricant onto the magnetic disk medium with the wick is difficult to apply to a thin lubricant film having a thickness equal to or smaller than 1 $\mu$m, and cannot be applied to a contact type magnetic disk suitable to a high recording density. The reason for this is as follows. If the thickness of the lubricant film is increased, the gap between the magnetic head and the magnetic disk medium increases. Since the recording density largely depends on the distance between the magnetic head and the magnetic disk medium, a high recording density cannot be achieved.

Furthermore, with the shapes of the contact pads disclosed in Japanese Patent Laid-Open Nos. 6-12808, 6-44718, and 7-147070, it is difficult to prevent the lubricant from moving to the outer peripheral portion due to the centrifugal force. This is because with these contact pad shapes the lubricant cannot be moved from the outer peripheral portion to the inner peripheral portion of the magnetic disk medium.

SUMMARY OF THE INVENTION

It is an object of the present invention to provide a magnetic head slider and a magnetic disk apparatus in which the lubricant that has moved to the outer peripheral side with the centrifugal force is moved to the inner peripheral side, thereby preventing wear and damage to the magnetic disk medium and magnetic head slider.

It is another object of the present invention to provide a magnetic head slider and a magnetic disk apparatus which have a high recording density and high reliability.

In order to achieve the above objects, according to the present invention, there is provided a magnetic head slider comprising a magnetic head which moves relative to a magnetic disk medium while being in contact therewith, thus recording/reproducing information, a contact pad integrally formed with the magnetic head and having a slide surface to slide on a surface of the magnetic disk medium, and a lubricant supply structure formed in the slide surface of the contact pad to move a lubricant applied on the surface of the magnetic disk medium from an outer peripheral portion to an inner peripheral portion of the magnetic disk medium along with a slide operation of the contact pad.

BRIEF DESCRIPTION OF THE DRAWINGS

FIG. 2A is a view showing the state of the lubricant flowing near the contact pad shown in FIG. 1, and FIG. 2B is a view showing the state of the lubricant flowing near a conventional contact pad;

DESCRIPTION OF THE PREFERRED EMBODIMENT

The present invention will be described in detail with reference to the accompanying drawings.

Figure 1:
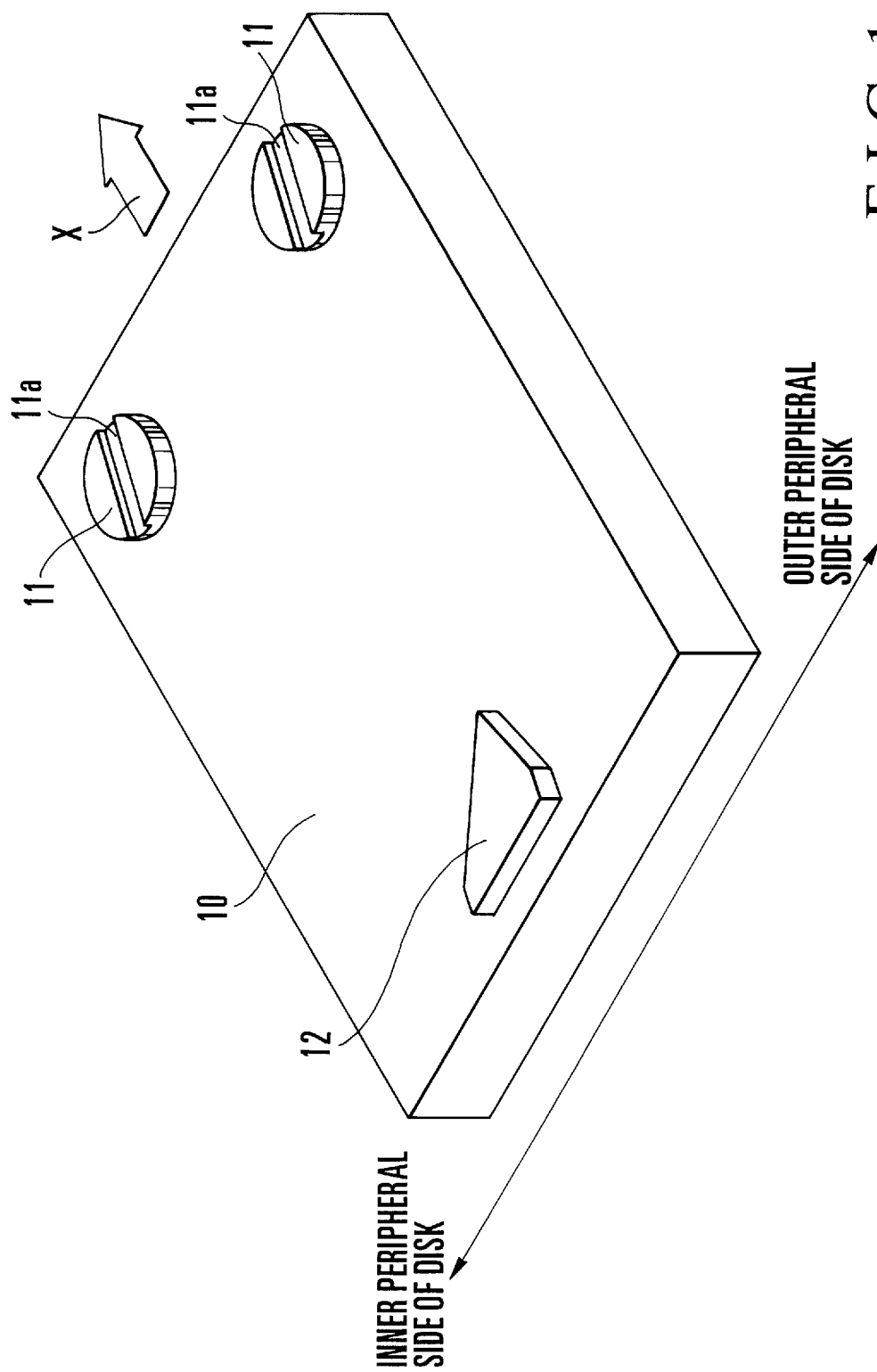
FIG. 1 is a perspective view showing the basic arrangement of a magnetic head slider according to an embodiment of the present invention.

FIG. 1 shows a magnetic head slider according to an embodiment of the present invention. Referring to FIG. 1, a magnetic head slider 10 has a pair of contact pads 11 and an asymmetric contact pad 12. The contact pads 11 are disposed at the leading portion in the traveling direction of the magnetic head slider indicated by an arrow X. Each contact pad 11 has a groove 11a. The contact pad 12 is disposed at the trailing portion in the traveling direction X of the magnetic head slider. The groove 11a of each contact pad 11 is formed to have a predetermined angle on the outer peripheral side of the magnetic disk medium with respect to the traveling direction X of the magnetic head slider. The contact pad 12 has an almost triangular shape having a vertex in the traveling direction X of the magnetic head slider. The line connecting the vertex and the middle point of the base of the triangle has a predetermined angle on the outer peripheral side of the magnetic disk medium with respect to the traveling direction X of the magnetic head slider.

The contact pads 11 and contact pad 12 serve as portions that accept a pressure produced when the magnetic head slider 10 moves relative to the surface of the magnetic disk medium while being in contact with it, and have a function of moving the lubricant applied on the magnetic disk medium from the outer peripheral portion to the inner peripheral portion with their specific shapes.

FIG. 2A shows a state wherein the contact pad 11 having the groove 11a slides on the magnetic disk medium, and FIG. 2B shows a state wherein a conventional contact pad not formed with a groove slides on the magnetic disk medium. In FIG. 2B, a lubricant 21 divided by the contact pad 22 is symmetric between the inner and outer peripheral sides of the magnetic disk medium. In contrast to this, in the contact pad 11 of this embodiment shown in FIG. 2A, the flow of a lubricant 21 is asymmetric between the inner and outer peripheral sides due to the lubricant 21 flowing through the groove 11a. It is apparent that the lubricant 21 moves from the outer peripheral side to the inner peripheral side.

Figure 3A:
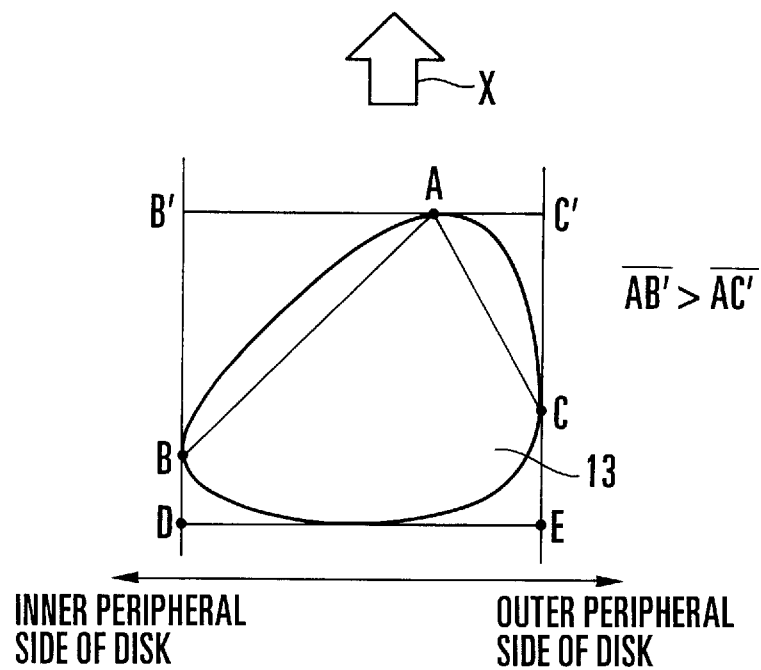
FIG. 3A is a view showing another example of the contact pad.
Figure 3B:
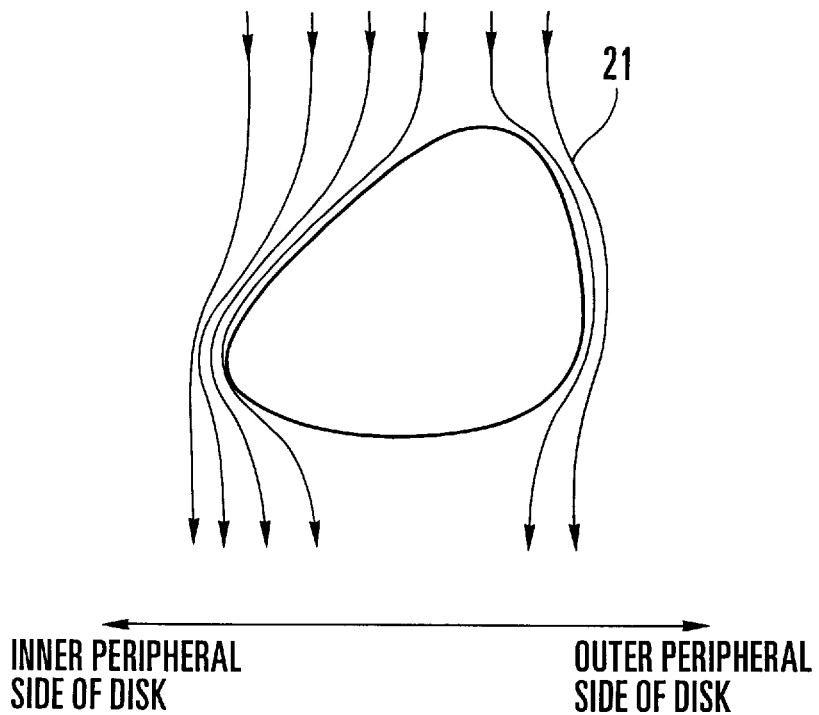
FIG. 3B is a view showing the state of the lubricant flowing near the contact pad shown in FIG. 3A.

FIG. 3A shows another example of the contact pad used in the magnetic head slider of the present invention, and FIG. 3B shows a state wherein the contact pad shown in FIG. 3A slides on the magnetic disk medium. In a contact pad 13 shown in FIG. 3A, the length of a radial component AB' of a line segment AB connecting the leading-most portion (point A) in a traveling direction X of the magnetic head slider and the innermost peripheral portion (point B) on the inner peripheral side of the disk is set larger than the length of a radial component AC' of a line segment AC connecting the leading-most portion (point A) in the traveling direction X of the magnetic head slider and an outermost peripheral portion (point C) on the outer peripheral side of the disk. As shown in FIG. 3B, the flow of a lubricant 21 becomes asymmetric between the inner and outer peripheral sides of the disk, in the same manner as in the contact pad 11 shown in FIG. 2A, so that the lubricant 21 can be moved from the outer peripheral side to the inner peripheral side. The contact pad 13 shown in FIG. 3A and the contact pad 12 shown in FIG. 1 are identical in terms of the principle of motion of the lubricant 21.

The operating principle of the present invention is that the force with which the magnetic head slider 10 slides on the magnetic disk medium is converted into the force for moving the lubricant 21 from the outer peripheral side to the inner peripheral side in accordance with the shape of the contact pads 11 to 13. This can prevent depletion of the lubricant 21 on the magnetic disk medium on the inner and intermediate peripheral portions.

When the magnetic head slider 10 is caused to perform a seek operation from the outer peripheral portion to the inner peripheral portion of the magnetic disk medium at a predetermined time interval, or when the magnetic head slider 10 is caused to perform a seek operation from the outer peripheral portion to the inner peripheral portion of the magnetic disk medium after the magnetic disk apparatus does not perform a seek operation for a predetermined period of time, the effect of preventing depletion of the lubricant 21 becomes conspicuous. This is because if the seek operation interval is excessively long or the seek operation is not performed over the entire surface of the magnetic disk medium, the lubricant 21 cannot be uniformly supplied onto the entire surface of the magnetic disk medium.

The effect of preventing depletion of the lubricant 21 also becomes conspicuous due to the following reasons by setting a mass M of the magnetic head slider to satisfy 0.1 mg≦M≦10 mg. If the mass of the magnetic head slider 10 is excessively small, its slide operation becomes unstable due to the resistance occurring when the contact pads 11 to 13 divide the lubricant, and the lubricant 21 cannot be supplied. Inversely, if the mass of the magnetic head slider 10 is excessively large, the magnetic head slider 10 cannot follow the magnetic disk medium, and the lubricant 21 cannot be supplied.

According to the present invention, wear and damage to the magnetic head slider 10 and the magnetic disk medium can be prevented based on the above principle, and a high recording density and high reliability of the magnetic disk apparatus can be realized.

The practical examples of the contact type magnetic disk apparatus according to the present invention will be described.

Figure 4:
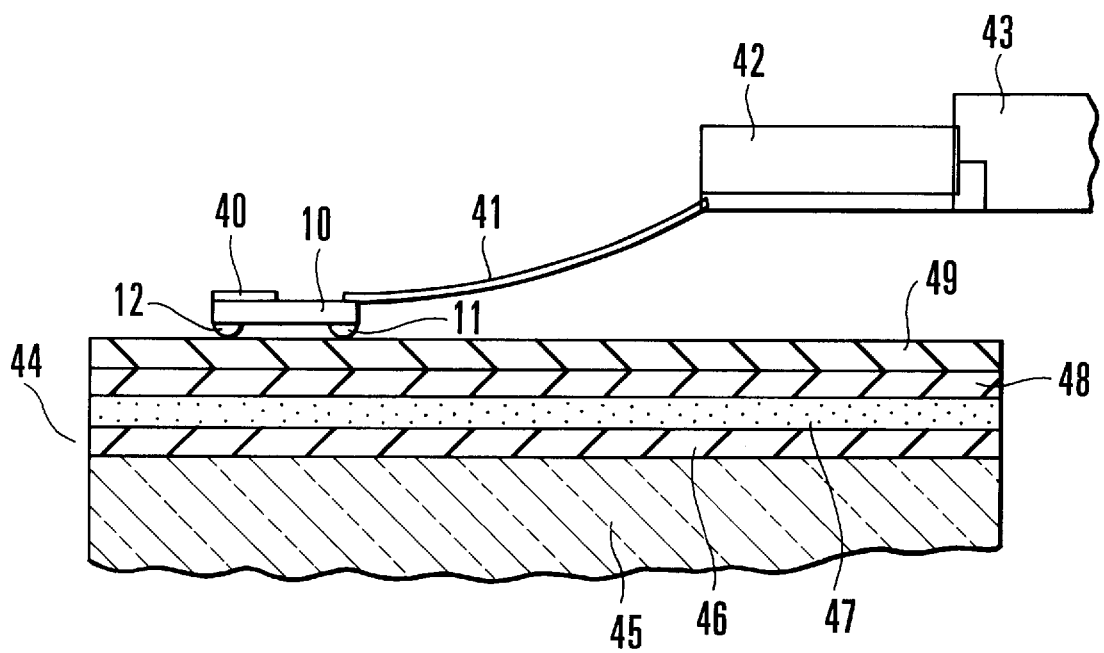
FIG. 4 is a sectional view showing the basic arrangement of a magnetic disk apparatus according to the present invention.

FIG. 4 shows the basic arrangement of the contact type magnetic disk apparatus according to the present invention. Referring to FIG. 4, a glass plate having a diameter of 90 mm and a thickness of 0.3 mm is used as a substrate 45. As an underlayer 46, Cr is formed on the substrate 45 by sputtering to a thickness of 100 nm. As a magnetic body 47, CoCrTaPt is formed on the underlayer 46 by sputtering to a thickness of 30 nm. As a protective film 48, diamond-like carbon is formed on the magnetic body 47 by sputtering to a thickness of 5 nm.

As a lubricant 49, perfluoropolyether is formed on the protective film 48 by dipping to a thickness of 10 nm as a principle. The thickness of the lubricant 49 can be changed. The thickness of the lubricant 49 is set by controlling the concentration of the dipping solution. The substrate 45, the underlayer 46, the magnetic body 47, the protective film 48, and the lubricant 49 constitute a magnetic disk medium 44.

As a suspension spring 41 for supporting the magnetic head slider 10, a stainless steel spring having a length of 10 mm, a width of 0.5 mm, and a thickness of 0.03 mm is used. The load with which the magnetic head slider 10 is urged against the surface of the magnetic disk medium 44 by the suspension spring 41 is 500 mgf. As a spring support mechanism 42 for supporting the suspension spring 41, a stainless steel plate having a length of 15 mm, a width of 3 mm, and a thickness of 1 mm is used. As a seek mechanism 43 for causing the magnetic head slider 10 to perform the seek operation, a voice coil motor is used.

As the magnetic head slider 10, an $Al_2O_3$—TiC plate having a width of 1 mm, a length of 1.2 mm, and a thickness of 0.3 mm is basically used. The mass of the magnetic head slider 10 is 2 mg. To change the mass of the magnetic head slider 10, the size or material of the magnetic head slider 10 is changed. As a magnetic recording/reproducing element 40 held by the magnetic head slider 10, a thin film head having an NiFe-alloy thin film as the yoke material is used.

The contact pads 11 and 12 are formed as follows. 4-μm thick diamond-like carbon is deposited by chemical vapor deposition on an $Al_2O_3$—TiC substrate that forms the magnetic head slider 10, and milling with argon ions is performed. The pattern shape of the surfaces of the contact pads 11 and 12 is changed by changing the mask shape and milling conditions, as will be described later.

The contact pads 11 and 12 were arranged at positions as follows. The 30-μm diameter contact pads 11 were arranged at positions 50 μm from the leading edge in the traveling direction X of the magnetic head slider, which were 50 μm from the inner and outer peripheral sides of the disk, as the centers. The contact pad 12 was arranged at a position 50 μm from the trailing edge in the traveling direction X of the magnetic head slider, which was at the central position of the inner and outer peripheral sides of the disk. The depth of the groove 11a of each contact pad 11 was 10 nm, the width of the groove 11a was 5 μm, and the angle formed by the longitudinal direction of the groove 11a with respect to the traveling direction X of the magnetic head slider was 30°.

In place of the contact pad 12, another contact pad 11 may be arranged at the trailing end portion of the magnetic head slider. In this case, three contact pads 11 having the same shape are arranged on the magnetic head slider 10.

The size of the contact pad 13 shown in FIG. 3A was set to satisfy AC'=10 μm, AB'=20 μm, B'D=30 μm, and C'E=30 μm. Also in this case, three contact pads 13 may be arranged on the magnetic head slider 10.

Figure 5:
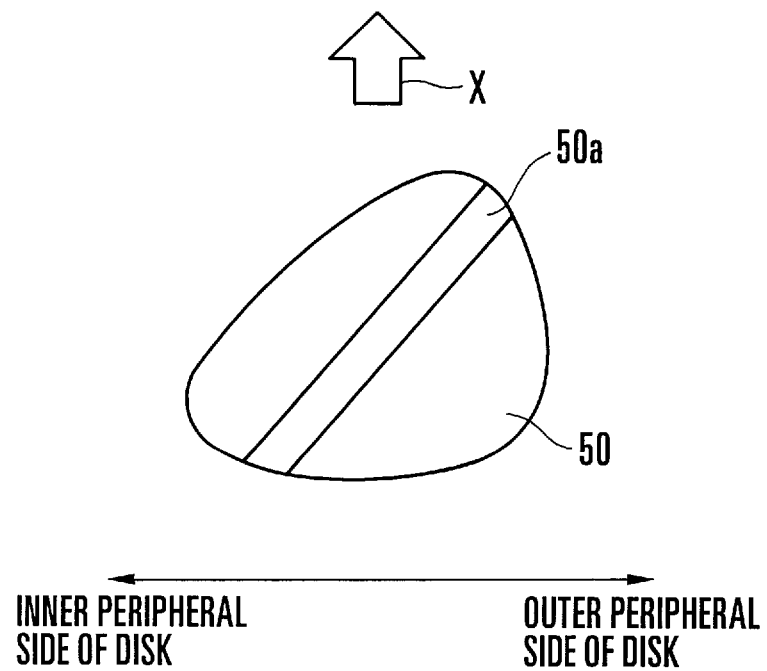
FIG. 5 is a view showing still another example of the contact pad.

FIG. 5 shows still another example of the magnetic head slider in which a contact pad 50 asymmetric between the inner and outer peripheral sides of the disk is further formed with a groove 50a. Selected combinations of formation of the groove 50a and shape of the contact pad 50 asymmetric between the inner and outer peripheral sides of the disk are expected provide an effect which is more conspicuous than in a case wherein merely the contact pad is used without paying any consideration on this issue of combinations. Referring to FIG. 3A, the shape of the contact pad 50 was set to satisfy AC'=10 μm, AB'=20 μm, B'D=30 μm, and C'E=30 μm. The depth of the groove 50a was 50 nm, the width of the groove 50a was 7 μm, and the angle formed by the longitudinal direction of the groove 50a with respect to the traveling direction X of the magnetic head slider was 45°. The groove 50a was arranged such that its center extended through the position of the center of gravity of the contact pad 50.

The magnetic head slider 10 having these contact pads 11, 13, and 50 is attached to the distal end of the suspension spring 41, as shown in FIG. 4. The proximal end of the suspension spring 41 is attached to the seek mechanism 43 through the spring support mechanism 42. The magnetic head slider 10 slides on the magnetic disk medium 44 rotating at a speed of 5,400 rpm while being in contact with it, and is moved by the seek mechanism 43 in the radial direction of the magnetic disk medium 44.

The materials, forming methods, and the like of the substrate 45, the underlayer 46, the magnetic body 47, the protective film 48, the lubricant 49, the magnetic head slider 10, the magnetic recording/reproducing element 40, the suspension spring 41, the spring support mechanism 42, the seek mechanism 43, and the contact pads 11, 13, and 50 are not particularly limited, and known materials and forming methods can be used without specific limitations.

Examples 1 to 7: A magnetic head slider 10 on which a total of three contact pads 11 each identical to the contact pad 11 shown in FIG. 2A were arranged was used. Of the contact pads 11, two were arranged at positions 50 μm from the leading edge in the traveling direction X of the magnetic head slider, which were 50 μm from the inner and outer peripheral edges of the disk, as the centers, and one was arranged at a position 50 μm from the trailing edge in the traveling direction X of the magnetic head slider, which was the central position between the inner and outer peripheral sides. The diameter of each contact pad 11 was 30 μm, the width of each groove 11a was 5 μm, and the angle formed by the longitudinal direction of the groove 11a with respect to the traveling direction X of the magnetic head slider was 30°. A perfluoropolyether-based lubricant was applied on the magnetic disk medium to a thickness of 10 nm. The depth of the groove 11a of the contact pads 11 was changed between 0.1 nm and 3,000 nm, as indicated in Table 1.

TABLE 1

Result of Sliding Durability Test

| Example No. | Depth of Contact Pad Groove (nm) | Operating Time Elapsed Until Error Rate Has Become Twice the Initial Value (hr.) |
|---|---|---|
| 1 | 0.1 | 156 |
| 2 | 0.5 | 344 |
| 3 | 1.0 | 2960 |
| 4 | 10 | 4317 |
| 5 | 100 | 5139 |
| 6 | 1000 | 3975 |
| 7 | 3000 | 791 |

Examples 8 to 15: A magnetic head slider 10 on which a total of three contact pads 13 each identical to the contact pad 13 shown in FIG. 3A were arranged was used. of the contact pads 13, two were arranged at positions 50 μm from the trailing edge in the traveling direction X of the magnetic head slider, which were 50 μm from the inner and outer peripheral edges of the disk, as the centers, and one was arranged at a position 50 μm from the leading edge in the traveling direction X of the magnetic head slider, which was the central position between the inner and outer peripheral sides. The shape of each contact pad 13 was set to satisfy B'D =30 μm and C'E=30 μm in FIG. 3A. As shown in Table 2, when the length of AB' was set to 10 μm or 20 μm, the length of AC' was changed between 5 μm and 30 μm. A hydrocarbon-based lubricant was applied on the magnetic disk medium to a thickness of 10 nm.

TABLE 2

Result of Sliding Durability Test

| Example No. | Length of AB' (μm) | Length of AC' (μm) | Operation Time Lapsed Until Error Rate Has Become Twice the Initial Value (hr.) |
|---|---|---|---|
| 8 | 20 | 5 | 8210 |
| 9 | 20 | 10 | 4162 |
| 10 | 20 | 20 | 50 |
| 11 | 20 | 30 | 28 |
| 12 | 10 | 5 | 2642 |
| 13 | 10 | 10 | 71 |
| 14 | 10 | 20 | 20 |
| 15 | 10 | 30 | 12 |

Examples 16 to 23: A magnetic head slider 10 on which a total of three contact pads 11 each identical to the contact pad 11 shown in FIG. 2A were arranged was used. Of the contact pads 11, two were arranged at positions 50 μm from the leading edge in the traveling direction X of the magnetic head slider, which were 50 μm from the inner and outer peripheral edges of the disk, as the centers, and one was arranged at a position 50 μm from the trailing edge in the traveling direction X of the magnetic head slider, which was the central position between the inner and outer peripheral sides. The diameter of each contact pad 11 was 30 μm, the width of each groove 11a was 5 μm, and the angle formed by the longitudinal direction of the groove 11a with respect to the traveling direction X of the magnetic head slider was 40°. The depth of the groove 11a of each contact pad 11 was 100 nm. The lubricant applied on the magnetic disk medium was a perfluoropolyether-based lubricant, and its thickness was changed between 0.1 nm and 300 nm, as indicated in Table 3.

TABLE 3

Result of Sliding Durability Test

| Example No. | Thickness of Lubricant (nm) | Operating Time Elapsed Until Error Rate Has Become Twice the Initial Value (hr.) |
|---|---|---|
| 16 | 0.1 | 437 |
| 17 | 0.5 | 918 |
| 18 | 1.0 | 4721 |
| 19 | 10 | 5139 |
| 20 | 50 | 6154 |
| 21 | 100 | 5762 |
| 22 | 150 | 761 |
| 23 | 300 | 825 |
| 24 | 0.1 | 235 |
| 25 | 0.5 | 439 |
| 26 | 1.0 | 3215 |
| 27 | 10 | 4175 |
| 28 | 50 | 5236 |
| 29 | 100 | 5125 |
| 30 | 150 | 663 |
| 31 | 300 | 592 |
| 32 | 10 | 22419 |

Examples 24 to 31: A magnetic head slider 10 on which a total of three contact pads 13 each identical to the contact pad 13 shown in FIG. 3A were arranged was used. Of the contact pads 13, two were arranged at positions 50 μm from the leading edge in the traveling direction X of the magnetic head slider, which were 50 μm from the inner and outer peripheral edges of the disk, as the centers, and one was arranged at a position 50 μm from the trailing edge in the traveling direction X of the magnetic head slider, which was the central position between the inner and outer peripheral sides. The shape of each contact pad 13 was set to satisfy AC'=10 μm, AB'=20 μm, B'D=30 μm, and C'E=30 μm in FIG. 3A. The lubricant applied on the magnetic disk medium was a perfluoropolyether-based lubricant, and its thickness was changed between 0.1 nm and 300 nm, as indicated in Table 3.

Example 32: A magnetic head slider 10 on which a total of three contact pads 50 each identical to the contact pad 50 shown in FIG. 5 were arranged was used. Of the contact pads 50, two were arranged at positions 50 μm from the leading edge in the traveling direction X of the magnetic head slider, which were 50 μm from the inner and outer peripheral edges of the disk, as the centers, and one was arranged at a position 50 μm from the trailing edge in the traveling direction X of the magnetic head slider, which was the central position between the inner and outer peripheral sides. The shape of each contact pad 50 was set to satisfy AC'=10 μm, AB'=20 μm, B'D=30 μm, and C'E=30 μm in FIG. 3A. The depth and width of each groove 50a were 50 μm and 7 μm, respectively, and the angle formed by the longitudinal direction of the groove 50a with respect to the traveling direction X of the magnetic head slider was 45°. The groove 50a was arranged such that its center extended through the center of gravity of the contact pad 50. The lubricant applied on the magnetic disk medium was a perfluoropolyether-based lubricant, and its thickness was 10 nm.

Examples 33 to 42: A magnetic head slider 10 on which a total of three contact pads 13 each identical to the contact pad 13 shown in FIG. 3A were arranged was used. Of the contact pads 13, two were arranged at positions 80 μm from the leading edge in the traveling direction X of the magnetic head slider, which were 70 μm from the inner and outer peripheral edges of the disk, as the centers, and one was arranged at a position 60 μm from the trailing edge in the traveling direction X of the magnetic head slider, which was the central position between the inner and outer peripheral sides. The shape of each contact pad 13 was set to satisfy AC'=12 μm, AB'=23 μm, B'D=35 μm, and C'E=35 μm in FIG. 3A. The lubricant applied on the magnetic disk medium was a perfluoropolyether-based lubricant, and its thickness was 10 nm. The mass of the magnetic head slider 10 was changed between 0.01 mg and 50 mg, as indicated in Table 4.

TABLE 4

Result of Sliding Durability Test

| Example No. | Mass of Magnetic Head Slider (mg) | Operating Time Elapsed Until Error Rate Has Become Twice the Initial Value (hr.) |
|---|---|---|
| 33 | 0.01 | 438 |
| 34 | 0.05 | 716 |
| 35 | 0.1 | 4721 |
| 36 | 0.5 | 5029 |
| 37 | 1.0 | 6134 |
| 38 | 3.0 | 5862 |
| 39 | 5.0 | 4771 |
| 40 | 10.0 | 4235 |
| 41 | 20.0 | 835 |
| 42 | 50.0 | 434 |

Comparative Example: In order to compare the embodiment of the present invention with the conventional technique, as a comparative example of the conventional magnetic head slider that did not employ the concept of the present invention, a magnetic head slider on which a total of three contact pads 22 each identical to the contact pad 22 shown in FIG. 2B were arranged was used. Of the contact pads 22, two were arranged at positions 50 μm from the leading edge in the traveling direction X of the magnetic head slider, which were 50 μm from the inner and outer peripheral edges of the disk, as the centers, and one was arranged at a position 50 μm from the trailing edge in the traveling direction X of the magnetic head slider, which was the central position between the inner and outer peripheral sides. The diameter of each contact pad 22 was 30 μm. The thickness of the lubricant applied on the magnetic disk medium was 100 nm.

Each of the magnetic head sliders shown in Examples 1 to 42 and the Comparative Example described above was caused to perform a seek operation once per minute within the radial range of 23 mm to 42 mm on the entire surface of a magnetic disk medium rotating at a speed of 5,400 rpm. Thereafter, the magnetic head slider was caused to slide on the magnetic disk medium at a random radial position to perform recording/reproduction. A sliding durability test was conducted in which these operations were repeated. As a method of evaluating the reliability of the contact type magnetic disk apparatus, the operation time elapsed until the error rate of the recording/reproduction signal had become twice the initial value was obtained. Tables 1 to 4 show the results (operation time) of this sliding durability test.

Examples 43 to 52: A magnetic head slider on which a total of three contact pads 13 each identical to the contact pad 13 shown in FIG. 3A were arranged was used. Of the contact pads 13, two were arranged at positions 50 μm from the leading edge in the traveling direction X of the magnetic head slider, which were 50 μm from the inner and outer peripheral edges of the disk, as the centers, and one was arranged at a position 50 μm from the trailing edge in the traveling direction X of the magnetic head slider, which was the central position between the inner and outer peripheral sides. The shape of each contact pad 13 was set to satisfy AC'=10 μm, AB'=20 μm, B'D=30 μm, and C'E=30 μm in FIG. 3A. A fluorinated carbon-based lubricant was applied on the magnetic disk medium to a thickness of 10 nm. Each of these magnetic head sliders 10 was caused to perform a seek operation once per lubricant supply seek time indicated in Table 5 from the outer peripheral side to the inner peripheral side within the radial range of 23 mm to 42 mm on a magnetic disk medium rotating at a speed of 5,400 rpm. Thereafter, the magnetic head slider was caused to slide on the magnetic disk medium at a random radial position to perform recording/reproduction. A sliding durability test was conducted in which these operations were repeated. As a method of evaluating the reliability of the contact type magnetic disk apparatus, the operation time elapsed until the error rate of the recording/reproduction signal had become twice the initial value was obtained. Table 5 shows the results (operation time) of this sliding durability test.

TABLE 5

Result of Sliding Durability Test

| Example No. | Lubricant Supply Seek Time | Operating Time Elapsed Until Error Rate Has Become Twice the Initial Value (hr.) |
|---|---|---|
| 43 | 1 sec. | 1838 |
| 44 | 5 sec. | 1916 |
| 45 | 30 sec. | 2072 |
| 46 | 1 min. | 4175 |
| 47 | 10 min. | 6134 |
| 48 | 30 min. | 5862 |
| 49 | 1 hr. | 4771 |
| 50 | 2 hr. | 2035 |
| 51 | 5 hr. | 1935 |
| 52 | 10 hr. | 1834 |

Examples 53 to 62: A magnetic head slider on which a total of three contact pads 13 each identical to the contact pad 13 shown in FIG. 3A were arranged was used. Of the contact pads 13, two were arranged at positions 50 μm from the leading edge in the traveling direction X of the magnetic head slider, which were 50 μm from the inner and outer peripheral edges of the disk, as the centers, and one was arranged at a position 50 μm from the trailing edge in the traveling direction X of the magnetic head slider, which was the central position between the inner and outer peripheral sides. The shape of each contact pad 13 was set to satisfy AC'=10 μm, AB'=20 μm, B'D=30 μm, and C'E=30 μm in FIG. 3A. A silicone oil-based lubricant was applied on the magnetic disk medium to a thickness of 10 nm. Each of these magnetic head sliders 10 was caused to perform a seek operation at a random time interval within the radial range of 23 mm to 42 mm on a magnetic disk medium rotating at a speed of 5,400 rpm. The seek operation was performed once from the outer peripheral side to the inner peripheral side when the time of the non-seek operation exceeded the lubricant supply reference time indicated in Table 6. Thereafter, the magnetic head slider was caused to slide on the magnetic disk medium at a random radial position to perform recording/reproduction. A sliding durability test was conducted in which these operations were repeated. As a method of evaluating the reliability of the contact type magnetic disk apparatus, the operation time elapsed until the error rate of the recording/reproduction signal had become twice the initial value was obtained. Table 6 shows the results (operation time) of this sliding durability test.

TABLE 6

Result of Sliding Durability Test

| Example No. | Lubricant Supply Reference Time | Operating Time Elapsed Until Error Rate Has Become Twice the Initial Value (hr.) |
| --- | --- | --- |
| 53 | 1 sec. | 3337 |
| 54 | 5 sec. | 3494 |
| 55 | 30 sec. | 3521 |
| 56 | 1 min. | 9528 |
| 57 | 10 min. | 9754 |
| 58 | 30 min. | 9632 |
| 59 | 1 hr. | 9212 |
| 60 | 2 hr. | 2936 |
| 61 | 5 hr. | 2855 |
| 62 | 10 hr. | 2730 |

Reference to the test results of Examples 1 to 62 indicated in Tables 1 to 6 and of the Comparative Example leads to the following discussion indicated in items A) to H).

A) Referring to the test results concerning Examples 1 to 7 and the Comparative Example, when the groove 11a is formed in the sliding surface of the contact pad 11 to extend from the leading outer peripheral portion, with the traveling direction of the magnetic head slider 10 being defined as the leading direction, toward the trailing inner peripheral portion, the operation time elapsed until the error rate has become twice the initial value is at least equal to or longer than four times that of a case wherein the groove is not formed (Comparative Example). More specifically, when the groove 11a is formed in the sliding surface of the contact pad 11 to extend from the leading outer peripheral portion, with the traveling direction of the magnetic head slider 10 being defined as the leading direction, toward the trailing inner peripheral portion, a magnetic disk apparatus having a high recording density and high reliability can be provided.

B) When the depth of the groove 11a is set equal to or larger than 1 nm and equal to or smaller than 1,000 nm, the operation time elapsed until the error rate has become twice the initial value is increased. In other words, the performance of the magnetic disk apparatus can be improved more effectively by setting the depth of the groove 11a equal to or larger than 1 nm and equal to or smaller than 1,000 nm.

C) Examples 8 to 15 will be compared. When the length of AB' in FIG. 3A is set larger than the length of AC', the operation time elapsed until the error rate has become twice the initial value is increased to be equal to or longer than 37 times. More specifically, concerning the shape of the contact pads 13, also when the length of the radial component of the line segment connecting the leading-most portion and innermost peripheral portion of the contact pad 13 in the traveling direction X of the magnetic head slider is set larger than the length of the radial component of the line segment connecting the leading-most portion in the traveling direction X of the magnetic head slider and the outermost peripheral portion of the contact pad 13, a magnetic disk apparatus having a high recording density and high reliability can be provided.

D) Examples 16 to 31 will be compared. When the thickness of the lubricant 21 is set equal to or larger than 1 nm and equal to or smaller than 100 nm, the operation time elapsed until the error time has become twice the initial value is increased to be equal to or larger than five times. In other words, the more appropriate range of the thickness of the lubricant 21 is equal to or more than 1 nm and equal to or smaller than 100 nm.

E) Examples 32, 5, and 9 will be compared. In Example 32, the operation time elapsed until the error rate has become twice the initial value is considerably longer than that of Examples 5 and 9. More specifically, concerning the shape of the contact pad 50, when the length of the radial component of the line segment connecting the leading-most portion and the innermost peripheral portion of the contact pad 50 in the traveling direction X of the magnetic head slider is set larger than that of the radial component of the line segment connecting the leading-most portion in the traveling direction X of the magnetic head slider and the outermost peripheral portion of the contact pad 50, and when the groove 50a is formed in the sliding surface of the contact pad 50 to extend from the leading outer peripheral portion, with the traveling direction of the magnetic head slider 10 being defined as the leading direction, toward the trailing inner peripheral portion, then the effect of "capable of providing a magnetic disk apparatus having a high recording density and high reliability" becomes more conspicuous.

F) Examples 33 to 42 will be compared. When the mass of the magnetic head slider 10 is set equal to or larger than 0.1 mg and equal to or smaller than 10 mg, the operation time elapsed until the error rate has become twice the initial value is increased to be at least equal to or longer than four times that obtained in cases other than this. Namely, the more appropriate range of the mass of the magnetic head slider 10 is equal to or larger than 0.1 mg and equal to or smaller than 10 mg.

G) Examples 43 to 52 will be compared. When the supply seek time of the lubricant 21 is set equal to or longer than 1 min. and equal to or shorter than 1 hr. the operation time elapsed until the error rate has become twice the initial value is increased to be at least equal to or shorter than twice that obtained in cases other than this. In other words, the more appropriate range of the supply seek time of the lubricant 21 is equal to or longer than 1 min. and equal to or shorter than 1 hr.

H) Examples 53 to 62 will be compared. When the supply reference time of the lubricant 21 is set equal to or longer than 1 min. and equal to or shorter than 1 hr., the operation time elapsed until the error rate has become twice the initial value is increased to be at least twice that obtained in cases other than this. In other words, the more appropriate range of the supply reference time of the lubricant 21 is equal to or longer than 1 min. and equal to or shorter than 1 hr.

From the discussion indicated in the above items A) to H), in the magnetic disk apparatus according to the present invention, durability at least equal to or better than four times that obtained in the conventional magnetic disk apparatus is achieved, and high reliability is ensured accordingly.

From the discussion indicated in the above items A) to E), the appropriate value of the depth of the groove of the contact pad and the appropriate value of the thickness of the lubricant in the contact type magnetic disk apparatus according to the present invention respectively fall within the following ranges.

Depth of groove of contact pad:
  equal to or larger than 1 nm and equal to or smaller than 1,000 nm Thickness of Lubricant:
  equal to or larger than 1 nm and equal to or smaller than 100 nm The theoretical ground for the presence of the ranges of the predetermined appropriate values is supposed to be as follows.

Regarding the depth of the groove of the contact pad, if it is excessively small, e.g., smaller than 1 nm, the present invention cannot be actually applied. If the depth of the groove of the contact pad is larger than 1,000 nm, a pressure caused by the air flow acts on the groove to interfere with the lubricant from flowing in the groove. Therefore, the effect of the present invention cannot be satisfactorily enhanced.

Regarding the thickness of the lubricant, if it is excessively small, the lubricant is strongly adsorbed by the medium surface of the magnetic disk medium. The lubricant cannot easily move from the outer peripheral side to the inner peripheral side, and the effect of the present invention cannot be satisfactorily enhanced. If the thickness of the lubricant is excessively large, the recording/reproducing characteristics of the magnetic head are degraded.

As has been described above, according to the present invention, the following effects can be obtained.

When a groove is formed in the sliding surface of the contact pad to extend from the leading outer peripheral portion, with the traveling direction of the magnetic head slider being defined as the leading direction, toward the trailing inner peripheral portion, or if the size of the radial component of the line segment connecting the leading-most portion in the traveling direction of the magnetic head slider and the innermost peripheral portion of the contact pad is set larger than the length of the radial component of the line segment connecting the leading-most portion in the traveling direction of the magnetic head slider and the outermost peripheral portion of the contact pad, a decrease in thickness and depletion of the lubricant, which tends to move toward the outer peripheral portion of the magnetic disk medium with the centrifugal force, can be prevented or controlled at the inner and intermediate peripheral portions of the magnetic disk medium. As a result, wear and damage to the magnetic head slider and the magnetic disk medium can be prevented, and a magnetic disk apparatus having a high recording density and high reliability can be provided.

What is claimed is:

1. A magnetic head slider comprising:
   a magnetic head which moves relative to a magnetic disk medium while being in contact therewith, thus recording/reproducing information;
   a contact pad integrally formed with said magnetic head and having a slide surface to slide on a surface of said magnetic disk medium; and
   a lubricant supply structure associated with said slide surface of said contact pad to move a lubricant applied on said surface of said magnetic disk medium from an outer peripheral portion to an inner peripheral portion of said magnetic disk medium during a slide operation of said contact pad.

2. A slider according to claim 1, wherein said lubricant supply structure comprises a groove extending from a leading end of said slide surface of said contact pad on an outer peripheral side of said disk toward a trailing end of said slide surface of said contact pad on an inner peripheral side of said disk.

3. A slider according to claim 2, wherein the groove forms an angle of at least 30° to 45° on said outer peripheral side of said disk with respect to a traveling direction of said head slider.

4. A slider according to claim 2, wherein the groove has a depth of not smaller than 1 nm and not larger than 1,000 nm.

5. A slider according to claim 1 wherein, as said lubricant supply structure, said contact pad has said slide surface in which a length of a radial component of a line segment connecting a leading-most portion and an innermost peripheral portion, on an inner peripheral side of said disk, of said contact pad is greater than a length of a radial component of a line segment connecting said leading-most portion and an outermost peripheral portion, on an outer peripheral side of said disk, of said contact pad.

6. A slider according to claim 5 wherein, as said lubricant supply structure, said contact pad further has a groove extending from a leading end of said slide surface of said contact pad on an outer peripheral side of said disk toward a trailing end of said slide surface of said contact pad on an inner peripheral side of said disk.

7. A slider according to claim 1, wherein said magnetic head slider has a mass of not smaller than 0.1 mg and not larger than 10 mg.

8. A magnetic disk apparatus comprising:
   a magnetic disk medium having a surface coated with a lubricant;
   a magnetic head slider having a magnetic head and a contact pad, said magnetic head moving relative to said magnetic disk medium while being in contact therewith, thus recording/reproducing information, and said contact pad being integrally formed with said magnetic head and having a slide surface to slide on a surface of said magnetic disk medium;
   a support spring for urging said magnetic head slider against said magnetic disk medium with a predetermined force; and
   a lubricant supply structure associated with said slide surface of said contact pad to move said lubricant applied on said surface of said magnetic disk medium from an outer peripheral portion to an inner peripheral portion of said magnetic disk medium during a slide operation of said contact pad.

9. An apparatus according to claim 8, wherein said lubricant applied on said magnetic disk medium has a thickness of not smaller than 1 nm and not larger than 100 nm.

10. An apparatus according to claim 8, further comprising a seek mechanism for performing a seek operation of moving said magnetic head slider from said outer peripheral portion to said inner peripheral portion of said magnetic disk medium every predetermined time interval,
    so that said lubricant is uniformly supplied to a surface of said head slider by the seek operation of said magnetic head slider.

11. An apparatus according to claim 10, wherein the seek operation is performed at an interval of not shorter than 1 min. and not longer than 1 hr.

12. An apparatus according to claim 8, further comprising a seek mechanism for performing a seek operation of moving said magnetic head slider from said outer peripheral portion to said inner peripheral portion of said magnetic disk medium when a non-seek operation interval reaches a lubricant supply reference time,
    so that said lubricant is uniformly supplied to a surface of said head slider by the seek operation of said magnetic head slider.

13. An apparatus according to claim 12, wherein the seek operation is performed at an interval of between about 1 min. and 1 hr.

* * * * *